United States Patent
Kramer et al.

(10) Patent No.: US 7,293,885 B2
(45) Date of Patent: Nov. 13, 2007

(54) MICROSCOPE WITH LASER LIGHT SOURCE AND PROTECTIVE DEVICE FOR PREVENTING EYE DAMAGE

(75) Inventors: Matthias Kramer, Goettingen (DE); Bruene Venus, Laboe (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 25 days.

(21) Appl. No.: 11/254,879

(22) Filed: Oct. 19, 2005

(65) Prior Publication Data

US 2006/0109459 A1    May 25, 2006

(30) Foreign Application Priority Data

Oct. 19, 2004   (DE)   .................. 10 2004 051 356

(51) Int. Cl.
*G02B 27/00* (2006.01)

(52) U.S. Cl. .................. 359/601; 359/368; 359/894

(58) Field of Classification Search .................. None
See application file for complete search history.

(56) References Cited

U.S. PATENT DOCUMENTS

| | | | |
|---|---|---|---|
| 4,900,695 A * | 2/1990 | Takahashi et al. | .......... 438/625 |
| 4,934,246 A * | 6/1990 | Benson et al. | ............. 89/36.14 |
| 5,634,923 A | 6/1997 | Brenner et al. | |
| 5,850,038 A | 12/1998 | Ue | |
| 6,258,081 B1 * | 7/2001 | Festag et al. | ................... 606/4 |
| 6,369,352 B1 * | 4/2002 | Aman et al. | ........... 219/121.63 |
| 2002/0101653 A1 * | 8/2002 | Muentener | ................... 359/376 |
| 2005/0015860 A1 * | 1/2005 | Reaux | ........................... 2/424 |

FOREIGN PATENT DOCUMENTS

| | | | |
|---|---|---|---|
| DE | 3638874 | | 5/1987 |
| DE | 10344294 A1 * | | 4/2005 |
| WO | WO 03/103523 | | 12/2003 |

* cited by examiner

*Primary Examiner*—Stephone B. Allen
*Assistant Examiner*—Lee Fineman
(74) *Attorney, Agent, or Firm*—Reed Smith LLP

(57) ABSTRACT

The invention is directed to a microscope in which laser light is used to irradiate a sample to be examined and which is outfitted with a protective device for preventing eye damage due to laser light. It is the object of the invention to provide a protective device for microscopes of the type described above which ensures protection against eye damage and visibility of the sample. According to the invention, the protective device has at least one area which is not transparent to harmful radiation components, but which is transparent to harmless, visible radiation components, so that an observer can see the sample through this area without risk of eye damage.

9 Claims, 2 Drawing Sheets

MICROSCOPE WITH LASER LIGHT SOURCE AND PROTECTIVE DEVICE FOR PREVENTING EYE DAMAGE

CROSS-REFERENCE TO RELATED APPLICATION

This application claims priority of German Application No. 10 2004 051 356.2, filed Oct. 19, 2004, the complete disclosure of which is hereby incorporated by reference.

BACKGROUND OF THE INVENTION a) Field of the Invention

The invention is directed to a microscope in which laser light is used to irradiate a sample to be examined and which is outfitted with a protective device for preventing eye damage due to laser light.

b) Description of the Related Art

When using laser light for microscopy, special protective measures must be undertaken in order to protect the user's vision. This is particularly true for TIRF microscopy (TIRF=Total Internal Reflection Fluorescence) because it uses relatively intensive laser radiation.

It is known from U.S. Pat. No. 5,850,038, for example, to place shutters in the microscope beam path which are coupled with the operating state of the laser and which prevent the laser radiation from reaching the observer's eye through the eyepieces.

Further, it is common for housing covers on optical devices operating with laser radiation to be provided with warning signs so as to draw attention to the danger subjectively. Safety regulations specify that the housing covers may only be opened with tools. However, the prerequisite of using tools to access microscope samples is disadvantageous and obstructive.

Completely enclosing a microscope operating with laser light with an opaque enclosure that protects the user is likewise disadvantageous because the sample space is difficult to access and the sample cannot be viewed.

A laser protection hood which encloses the sample space and is made of material that is not transparent to laser radiation is known. In this way, the laser radiation is completely blocked and does not reach the eyes of the user. This laser protection hood has a cover which is likewise opaque to laser radiation and which is articulated by hinges and provided with closing contacts which communicate with control electronics.

When the cover and, therefore, the contact are opened, the control electronics ensure that a shutter arranged in the laser beam path is switched on so as to block the propagation of the laser radiation.

In this way, an active laser protection is realized for the entire visible spectral region of the light coming from the laser. However, this likewise has the disadvantage that the sample is completely invisible to the user.

OBJECT AND SUMMARY OF THE INVENTION

On this basis, it is the primary object of the invention to provide a protective device for microscopes of the type described in the beginning which ensures protection against eye damage and also visibility of the sample.

According to the invention, the protective device has at least one area which is not transparent to harmful radiation components but which is transparent to harmless, visible radiation components so that an observer can see the sample through this area without risk of eye damage.

The protective device is preferably constructed as a housing enclosing the sample space, wherein the housing wall has at least one area that is transparent to harmless, visible radiation components of the laser light. Colored, particularly red-colored, plexiglass can be provided as material for the transparent area of the housing wall.

When red-colored plexiglass is provided, it is fashioned in such a way that light wavelengths less than 550 nm are blocked and light wavelengths greater than 550 nm are transmitted. The plexiglass should preferably be transparent to light wavelengths from 550 nm to 700 nm.

Further, the housing wall can have at least one area which is transparent to the laser radiation but which has a light-scattering effect such that the intensity of the exiting radiation components is not damaging to the eye. Milky-colored plexiglass or an etched pane of glass, for example, can be used as material.

There are conceivable constructions of the protective device according to the invention in which the housing wall has at least one light-scattering area as described above and also at least one area which allows harmless, visible radiation components to pass through without scattering.

In a particularly preferred construction, the housing is provided with at least one closeable opening for inserting objects into and removing objects from the sample space enclosed by the housing. The opening can be covered by a housing part. This housing part should be connected in a movable manner to the housing wall by hinges or guide rails.

The housing part serving to close the opening preferably communicates with a closing contact that is connected to the laser light source by a control circuit in such a way that it is impossible to switch on the laser light source when the opening is not closed.

Further, an optical device can be arranged inside the sample space enclosed by the housing for imaging the laser beam cross section on an area of the housing wall that is transparent to harmless, visible radiation components so that the laser beam cross section is visible to an observer viewing the housing from the outside without the risk of eye damage.

Further, it lies within the scope of the invention to construct the protective device as an incubation chamber which has at least one of the features mentioned above and which at the same time makes it possible to observe biological samples in a climate of defined air humidity, temperature and atmosphere during their growth process.

In the following, the invention will be described more fully with reference to an embodiment example.

DESCRIPTION OF THE PREFERRED EMBODIMENTS

Figure 1:
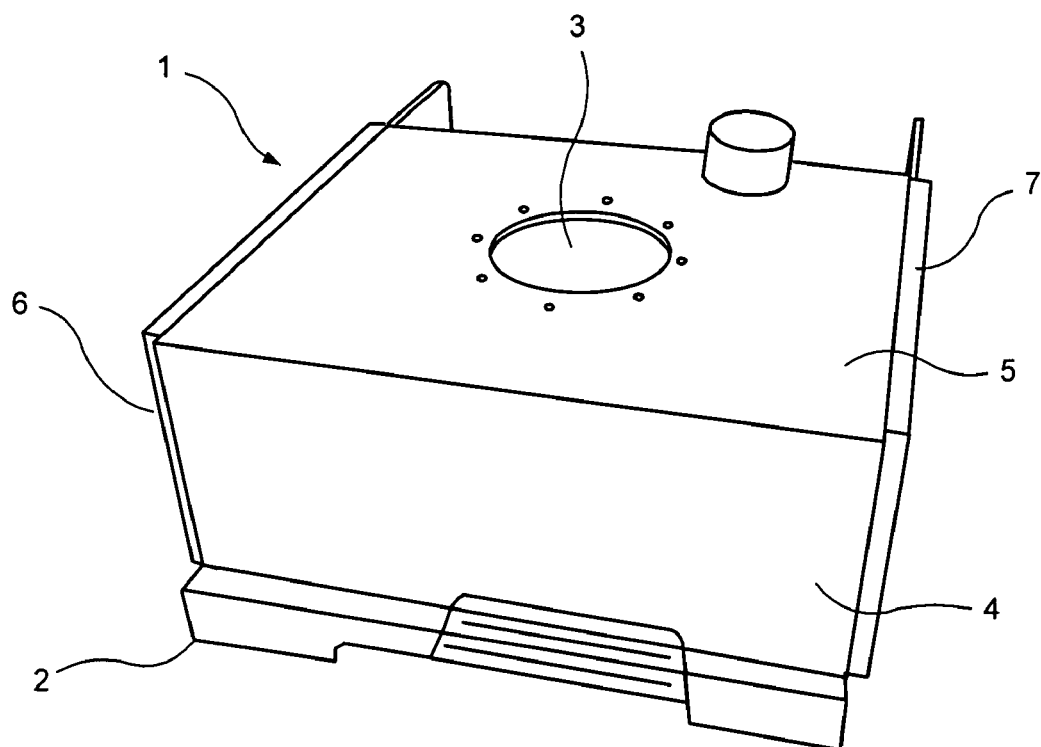
FIG. 1 shows a first view of a protective device which is constructed as a housing and which encloses the sample space of a microscope.

FIG. 1 shows a front view of a protective device for a microscope which is constructed in the form of a housing 1 enclosing the sample space and in which the sample, not shown, which is located inside the housing 1 is acted upon by laser light.

For the sake of clarity, the microscope subassemblies are not shown; only the sample stage 2, on which the housing 1 is placed, and a through-opening 3, e.g., for a condenser in this case, are visible.

According to the invention, the protective device which is constructed as a housing 1 has at least one area which is opaque to harmful radiation components but is transparent to harmless, visible radiation components so that an observer can see the sample through this area without the risking eye damage.

In the present embodiment example, the housing 1 is constructed in such a way that the front side 4 and the upper side 5 correspond to areas of the kind described above. They are made, for example, of red-colored plexiglass which is transparent to light wavelengths from 550 nm to 700 nm.

In this way, the user of the microscope is able to observe the sample through the front side 4 and/or through the upper side 5 without being exposed to the risk of eye damage because the harmful radiation components with light wavelengths less than 550 nm cannot penetrate these housing parts.

Further, FIG. 1 shows the side walls 6 and 7 of the housing 1 which comprise milky-white colored plexiglass in the present example.

Figure 2:
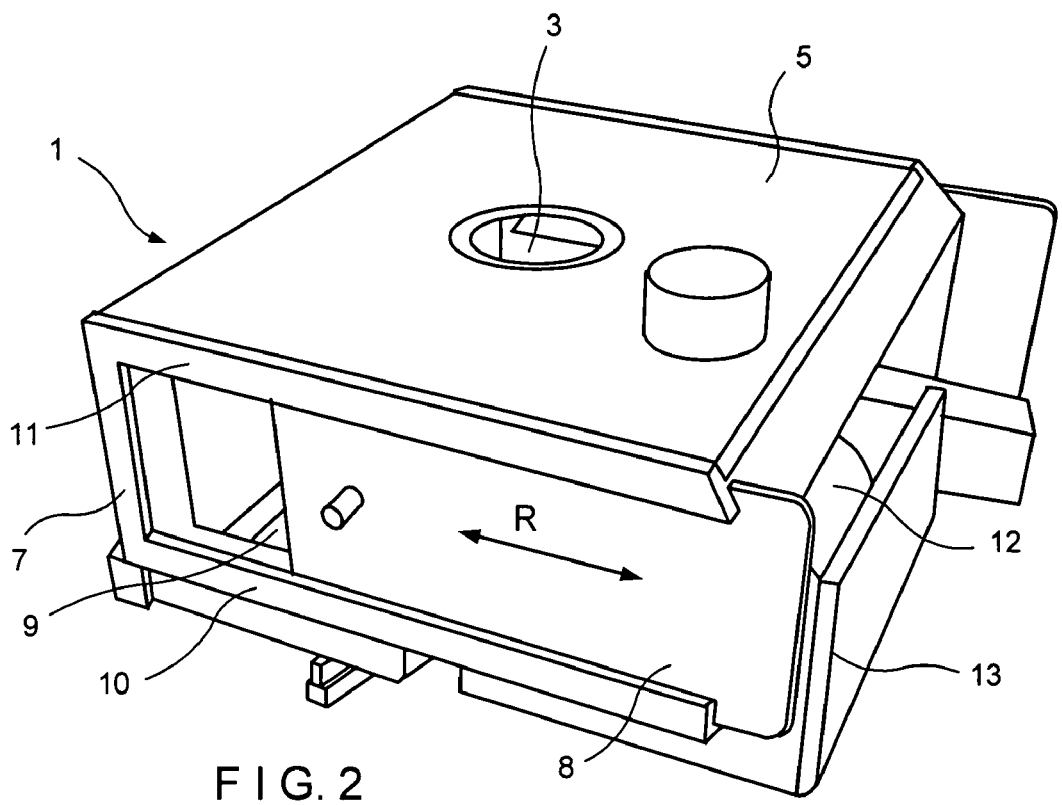
FIG. 2 shows a second view of the protective device according to FIG. 1.

FIG. 2 shows a side view of the housing 1 from FIG. 1. The upper side 5 of the housing 1 and the through-opening 3 can be seen in this figure.

As can further be seen from FIG. 2, the side wall 7 visible in this figure has an opening 9 that can be closed by a housing part 8. The housing part 8 is supported in guide rails 10 and 11 in such a way that it can be displaced relative to the housing 1 in the direction R indicated by the double arrow. Accordingly, it is possible to close and open the opening 9 by means of the housing part 8. In this way, the sample space is accessible from the outside when needed.

The housing part 8 advantageously communicates with a closing contact which is coupled with the laser light source by a control circuit in such a way that it is impossible to turn on the laser light source when the opening 8 is not closed, or the laser light source is turned off when the housing part 8 is displaced and the opening 9 is released during operation of the microscope when the source is turned on. In this way, an active protection against eye damage is provided.

Particularly for applications in TIRF, it is required to adjust the laser beam coupled into the microscope for the experiment. In order to carry this out under safe conditions for laser protection, it is advantageous when one or more surface portions with extensive scattering effect are formed in the wall of the housing 1 so that the laser beam can be seen from the outside, but without any risk of injury.

In view of the fact that the laser beam can be tilted by a large angle after exiting from the objective, particularly in TIRF applications, this surface area should be located on one of the side walls 6 or 7, on the front side 4, or on the upper side 5.

In a preferred construction, the housing part 8 can be provided as the surface portion with an extensive scattering effect.

The housing 1 can preferably be constructed as an incubator chamber so that it is possible to view biological samples during their growth process. To this end, the housing 1 has at its rear side 12 at least one incubation connection 13 by which the climate within the sample space can be influenced with respect to air humidity, temperature and gas atmosphere.

During incubation, biological samples are kept in a climate of defined air humidity, temperature and a defined gas mixture, so that cells and organisms can be viewed through the microscope during their growth process. Incubators of this kind are usually constructed so as to be completely transparent to allow the user easy access to the sample space above and below the objective. However, when the sample is irradiated by laser light, the protective device described above is advantageous and indispensable with regard to laser safety regulations.

Figure 3:
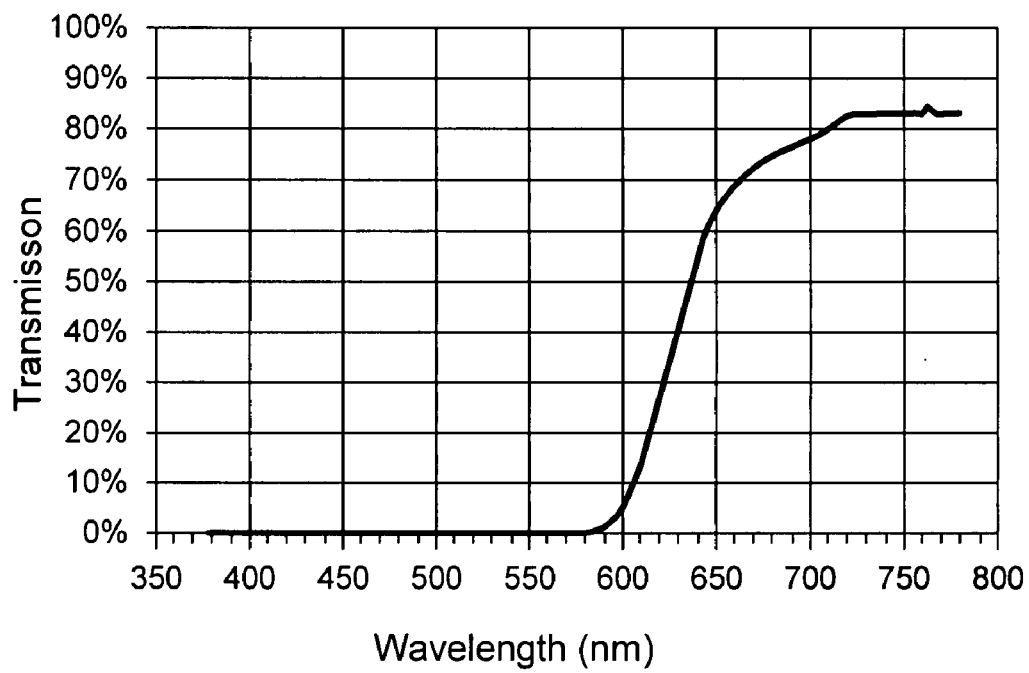
FIG. 3 is a graph showing the transmission of red-colored plexiglass in linear representation.

FIG. 3 shows a linear representation of the transmission of red-colored plexiglass such as is used, for example, for the front side 4 and the upper side 5 of the housing 1 described herein.

Figure 4:
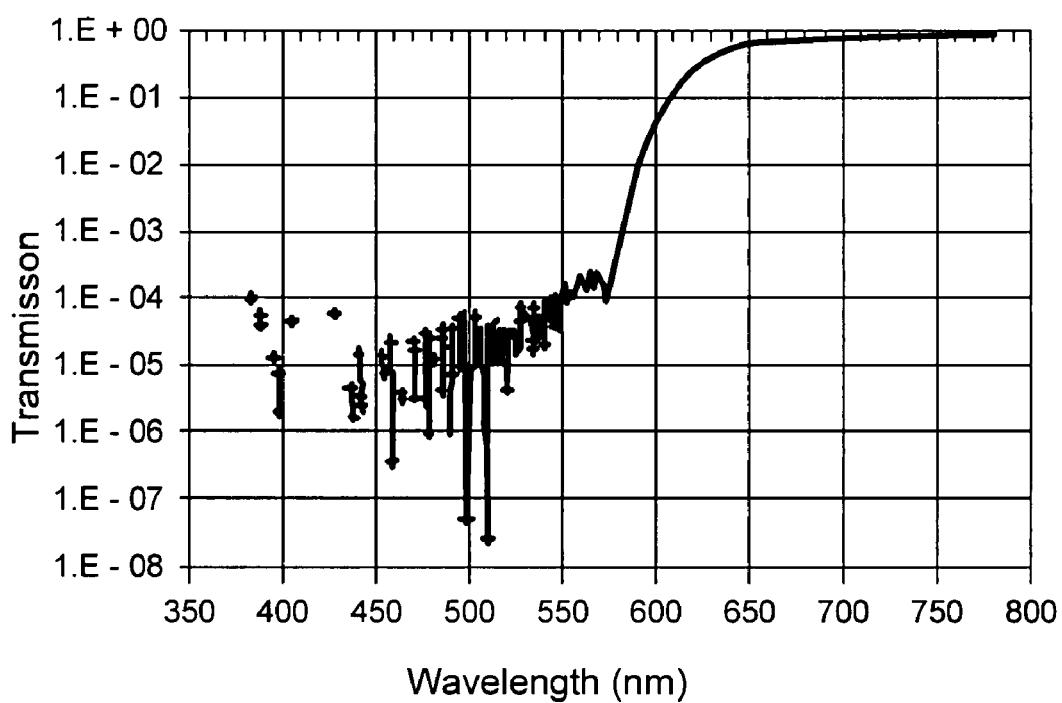
FIG. 4 is another graph showing the transmission of red-colored plexiglass in logarithmic representation.

FIG. 4 shows a logarithmic representation of this transmission.

As can be seen from FIG. 3 and FIG. 4, the intensity of the laser radiation is attenuated by a factor of 10,000 by the protective device in the wavelength range below 550 nm so that it is possible to use Class 3B lasers with a limited wavelength range without risk.

While the foregoing description and drawings represent the present invention, it will be obvious to those skilled in the art that various changes may be made therein without departing from the true spirit and scope of the present invention.

REFERENCE NUMBERS 1 housing
2 sample stage
3 through-opening for microscope objective
4 front side
5 upper side
6, 7 side walls
8 housing part
9 opening
10, 11 guide rails
12 rear side
13 incubation connection

What is claimed is:

1. A microscope in which laser light is used to irradiate a sample to be examined and which is outfitted with a protective device for preventing eye damage due to laser light comprising that the protective device has at least one area which is not transparent to harmful radiation components but which is transparent to harmless, visible radiation components, so that an observer can see the sample through this area without risk of eye damage,
wherein the protective device is constructed as a housing enclosing the sample space, wherein the housing wall has at least one area that is transparent to harmless, visible radiation components.

2. The microscope according to claim 1, wherein colored plexiglass is provided as material for the transparent area of the housing.

3. The microscope according to claim 2, wherein the colored plexiglass is a red-colored plexiglass which is not transparent to light wavelengths less than 550 nm and which is transparent to light wavelengths greater than 550 nm is provided.

4. The microscope according to claim 1, wherein the protective device is constructed as the housing enclosing the sample space, wherein the housing has at least one area which is transparent to the laser radiation but which has a light-scattering effect such that the intensity of the exiting radiation components is not damaging to the eye.

5. The microscope according to claim 1, wherein the housing is provided with at least one closeable opening for inserting objects into and removing objects from the sample space enclosed by the housing, wherein the opening can be covered by a housing part.

6. The microscope according to claim 5, wherein the housing part serving to close the opening is displaceably connected to the housing wall by hinges or guide rails.

7. The microscope according to claim 6, wherein the housing part serving to close the opening communicates with a closing contact that is connected to the laser light source by a control circuit in such a way that it is impossible to switch on the laser light source when the opening is not closed.

8. The microscope according to claim 1, wherein an optical device is arranged inside the sample space enclosed by the housing for imaging the laser beam cross section on an area of the housing wall that is transparent to harmless, visible radiation components so that the laser beam cross section is visible to an observer viewing the housing from the outside without the risk of eye damage.

9. The microscope according to claim 1, wherein the protective device is constructed as an incubation chamber so that it is possible to observe biological samples in a climate of defined air humidity, temperature and atmosphere during their growth process.

* * * * *